(12) United States Patent
Yoshiga et al.

(10) Patent No.: US 12,139,092 B2
(45) Date of Patent: Nov. 12, 2024

(54) SEAT BACK OF VEHICLE SEAT

(71) Applicants: NHK SPRING CO., LTD., Yokohama (JP); SUBARU CORPORATION, Tokyo (JP)

(72) Inventors: Kensuke Yoshiga, Yokohama (JP); Hiroki Jineda, Yokohama (JP); Takashi Kamibayashi, Tokyo (JP); Masafumi Takano, Tokyo (JP)

(73) Assignees: NHK Spring Co., Ltd., Yokohama (JP); Subaru Corporation, Tokyo (JP)

( * ) Notice: Subject to any disclaimer, the term of this patent is extended or adjusted under 35 U.S.C. 154(b) by 0 days.

(21) Appl. No.: 18/509,044

(22) Filed: Nov. 14, 2023

(65) Prior Publication Data

US 2024/0166156 A1 May 23, 2024

(30) Foreign Application Priority Data

Nov. 17, 2022 (JP) ................................ 2022-184058

(51) Int. Cl.
| | | |
|---|---|---|
| *B60R 21/207* | (2006.01) | |
| *B60R 21/215* | (2011.01) | |
| *B60N 2/64* | (2006.01) | |

(52) U.S. Cl.
CPC .......... *B60R 21/207* (2013.01); *B60R 21/215* (2013.01); *B60N 2/646* (2013.01)

(58) Field of Classification Search
CPC ...... B60R 21/207; B60R 21/215; B60N 2/646
USPC ................. 280/730.2, 743.1, 743.2
See application file for complete search history.

(56) References Cited

U.S. PATENT DOCUMENTS

| | | | | |
|---|---|---|---|---|
| 7,669,889 B1* | 3/2010 | Gorman | ................ | B60R 21/207 280/730.2 |
| 2006/0113752 A1* | 6/2006 | Tracht | ................... | B60R 21/207 280/730.2 |
| 2006/0113762 A1* | 6/2006 | Tracht | ................... | B60R 21/207 280/730.2 |
| 2012/0175862 A1* | 7/2012 | Tracht | ................... | B60R 21/207 280/730.2 |
| 2013/0119646 A1* | 5/2013 | Tracht | ................... | B60R 21/217 29/428 |
| 2014/0117648 A1* | 5/2014 | Tracht | ................... | B60R 21/207 29/428 |

(Continued)

FOREIGN PATENT DOCUMENTS

JP 3520357 B 4/2004

*Primary Examiner* — Toan C To
(74) *Attorney, Agent, or Firm* — Knobbe, Martens, Olson & Bear, LLP (57) ABSTRACT

A seat back of a vehicle seat, including: a side frame provided inside a cushion member in which an accommodation portion is formed; a cover material that covers a surface of the cushion member; an airbag accommodated in a folded state in the accommodation portion; a cylindrical inflator provided in the accommodation portion; a first retaining cloth, one end portion of which is connected to a rupture portion; a second retaining cloth, one end portion of which is connected to the rupture portion; and a joining member that joins together the respective other end portions of the first retaining cloth and second retaining cloth at the accommodation portion, wherein, when viewed along an axis of the inflator, a front end portion of the side frame is disposed forward of the inflator and the joining member is disposed forward of a front end portion of the side frame.

5 Claims, 5 Drawing Sheets

(56) References Cited

U.S. PATENT DOCUMENTS

| | | | |
|---|---|---|---|
| 2014/0191496 A1* | 7/2014 | Tracht | B60R 21/207 |
| | | | 280/730.2 |
| 2015/0336528 A1* | 11/2015 | Tanabe | B60N 2/5841 |
| | | | 280/728.2 |
| 2016/0325646 A1* | 11/2016 | Tanabe | B60N 2/42 |
| 2019/0217807 A1* | 7/2019 | Kobayashi | B60R 21/239 |
| 2021/0354649 A1* | 11/2021 | Sakurai | B60R 21/233 |

\* cited by examiner

SEAT BACK OF VEHICLE SEAT

CROSS-REFERENCE TO RELATED APPLICATION

This application is based on and claims priority under 35 USC 119 from Japanese Patent Application No. 2022-184058 filed on Nov. 17, 2022, the entire disclosure of which is incorporated by reference herein.

BACKGROUND

Technical Field

The present disclosure relates to a seat back of a vehicle seat.

Related Art

A vehicle seat is disclosed in Japanese Patent No. 3,520,357. A seat back of this vehicle seat is equipped with a cushion member, an airbag and an inflator. An accommodation portion (a recess portion) is formed in one side face of the cushion member. The airbag is accommodated in a folded state in the accommodation portion, and the inflator is provided in the accommodation portion. The seat back is further equipped with a cover material that covers surfaces of the cushion member and in which a rupture portion is formed. One end portions of a first retaining cloth and a second retaining cloth are connected at the rupture portion of the cover material.

When the inflator produces gas as a result of a vehicle in which this vehicle seat is installed being in a collision, an airbag to which the gas is supplied inflates to the outer side of the cover material while rupturing the rupture portion.

A structure is assumed in which other end portions of the first retaining cloth and the second retaining cloth are disposed in the accommodation portion and the other end portions of the first retaining cloth and second retaining cloth are sewn together with a sewing thread. In this structure, at a time of gas production, the sewing thread may be greatly affected by heat generated by the inflator.

SUMMARY

The present disclosure provides a seat back of a vehicle seat that may make heat generated by an inflator less likely to affect a joining member that joins together respective end portions of a first retaining cloth and a second retaining cloth in an accommodation portion of a cushion member that accommodates an airbag and the inflator.

A seat back of a vehicle seat according to a first aspect of the present disclosure includes: a cushion member including a side portion in which a hollow accommodation portion is formed; a side frame that forms a side portion of a seat back frame that is provided inside the cushion member; a cover material that covers a surface of the cushion member; an airbag accommodated in a folded state in the accommodation portion; a cylindrical inflator fixed to the side frame in the accommodation portion, the inflator being configured to supply gas to the airbag such that the airbag expands to the outer side of the cover material while rupturing a rupture portion formed in a portion of the cover material; a first retaining cloth, one end portion of which is connected to the rupture portion; a second retaining cloth, one end portion of which is connected to the rupture portion and another end portion of which is connected to another end portion of the first retaining cloth, the second retaining cloth forming an accommodation space that accommodates the airbag and the inflator between the second retaining cloth and the first retaining cloth; and a joining member that joins together the respective other end portions of the first retaining cloth and second retaining cloth at the accommodation portion. When viewed along an axis of the inflator, a front end portion of the side frame is disposed forward of the inflator and the joining member is disposed forward of a front end portion of the side frame.

When the seat back according to the first aspect is viewed along the axis of the inflator, the front end portion of the side frame is disposed forward of the inflator, and the joining portion at which the respective other end portions of the first retaining cloth and second retaining cloth are joined to one another is disposed forward of the front end portion of the side frame. Thus, a distance between the inflator and the joining member in the front-and-rear direction is significantly far. Therefore, heat generated by the inflator at a time of gas production is unlikely to affect the joining member at the accommodation portion of the cushion member.

In a seat back of a vehicle seat according to a second aspect of the present disclosure, in the seat back of a vehicle seat according to the first aspect, an inner side end face of the accommodation portion opposes the respective other end portions of the first retaining cloth and second retaining cloth, the inner side end face being an end face of the accommodation portion at a width direction inner side of the seat back.

If the respective other end portions of the first retaining cloth and second retaining cloth were disposed at an end portion of the accommodation portion at the width direction outer side of the seat back, the respective other end portions of the first retaining cloth and second retaining cloth might press against an inner face of the cover material, and a portion of the cover material being pressed by the other end portions might be raised to the outer side of the cover material. By contrast, in the seat back according to the second aspect, the respective other end portions of the first retaining cloth and second retaining cloth oppose the inner side end face of the accommodation portion. Therefore, there is no risk of a portion of the cover material being raised to the outer periphery side by the respective other end portions of the first retaining cloth and second retaining cloth.

In a seat back of a vehicle seat according to a third aspect of the present disclosure, in the seat back of a vehicle seat according to the second aspect, when viewed along the axis of the inflator, a front end face of the accommodation portion is disposed forward of the front end portion of the side frame, and a region of the accommodation portion at which the front end face and the inner side end face are connected opposes the respective other end portions of the first retaining cloth and second retaining cloth.

In the seat back according to the third aspect, the region of the accommodation portion at which the front end face and the inner side end face are connected opposes the respective other end portions of the first retaining cloth and second retaining cloth. Therefore, the distance between the joining member and the inflator in the front-and-rear direction is far. Consequently, heat generated by the inflator is even less likely to affect the joining member at the accommodation portion of the cushion member.

In a seat back of a vehicle seat according to a fourth aspect of the present disclosure, in the seat back of a vehicle seat according to the first aspect or the second aspect, the one end portions of the first retaining cloth and second retaining cloth are sewn to the rupture portion by a first sewing thread, and the respective other end portions of the first retaining cloth and second retaining cloth are sewn to one another by a second sewing thread with a higher strength than the first sewing thread.

In the seat back according to the fourth aspect, the one end portions of the first retaining cloth and second retaining cloth are sewn to the rupture portion by the first sewing thread, and the respective other end portions of the first retaining cloth and second retaining cloth are sewn to one another by the second sewing thread, which is higher in strength than the first sewing thread. Therefore, the second sewing thread is less likely to be damaged by the effects of heat generated by the inflator than in a structure in which the strength of a second sewing thread is equal to or less than the strength of a first sewing thread.

As described above, according to a seat back of a vehicle seat according to the present disclosure, heat generated by an inflator is unlikely to affect a joining member that joins end portions of a first retaining cloth and second retaining cloth to one another in an accommodation portion of a cushion member that accommodates an airbag and the inflator.

BRIEF DESCRIPTION OF THE DRAWINGS

An exemplary embodiment of the present disclosure will be described in detail based on the following figures, wherein.

DETAILED DESCRIPTION

Below, a vehicle seat 10 (below referred to as "the seat 10") according to an exemplary embodiment of the present disclosure is described using the attached drawings. An arrow FR that is shown where appropriate in the drawings indicates a vehicle front direction, an arrow UP indicates a vehicle upper direction, and an arrow LH indicates the left side in a vehicle left-and-right direction (a vehicle width direction). Below, where descriptions are given simply using front and rear, left and right, and upper and lower directions, these refer to front and rear in the vehicle front-and-rear direction, left and right in the vehicle left-and-right direction (the vehicle width direction), and upper and lower in the vehicle vertical direction.

Figure 1:
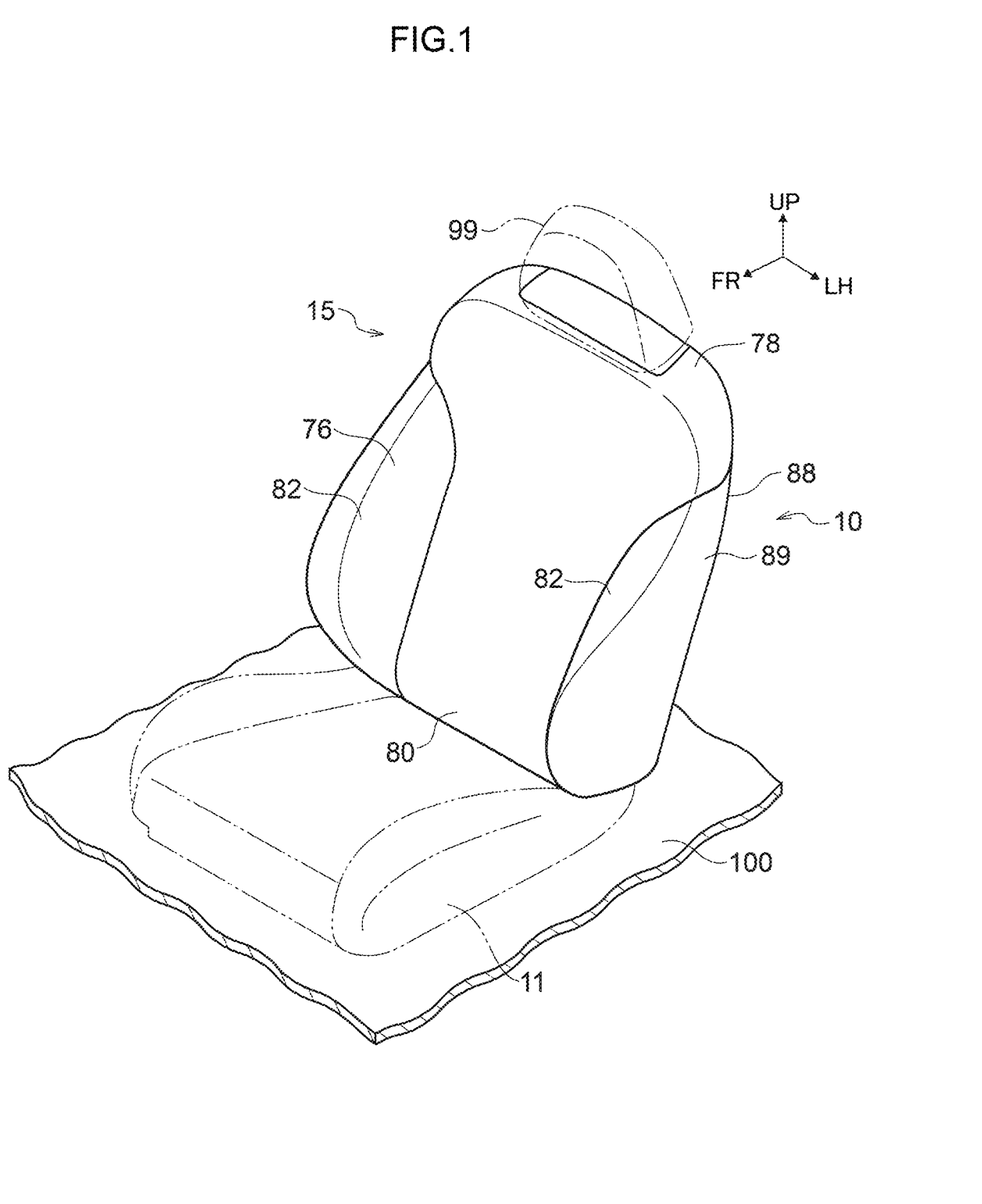
FIG. 1 is a perspective view of a vehicle seat equipped with a seat back according to the exemplary embodiment of the present disclosure.

The seat 10 illustrated in FIG. 1 is provided on a floor face 100 of a cabin of the vehicle. The seat 10 is equipped with a seat cushion 11, a seat back 15 and a head rest 99. A lower end portion of the seat back 15 is turnably connected to a rear end portion of the seat cushion 11. The seat cushion 11 is supported by slide rails (not shown in the drawings) that are disposed on the floor face 100.

The seat back 15 is equipped with a cushion member 20, a seat back frame 50, an inflator 64, an airbag 74, a cover material 76, a first retaining cloth 92 and a second retaining cloth 96.

Figure 2:
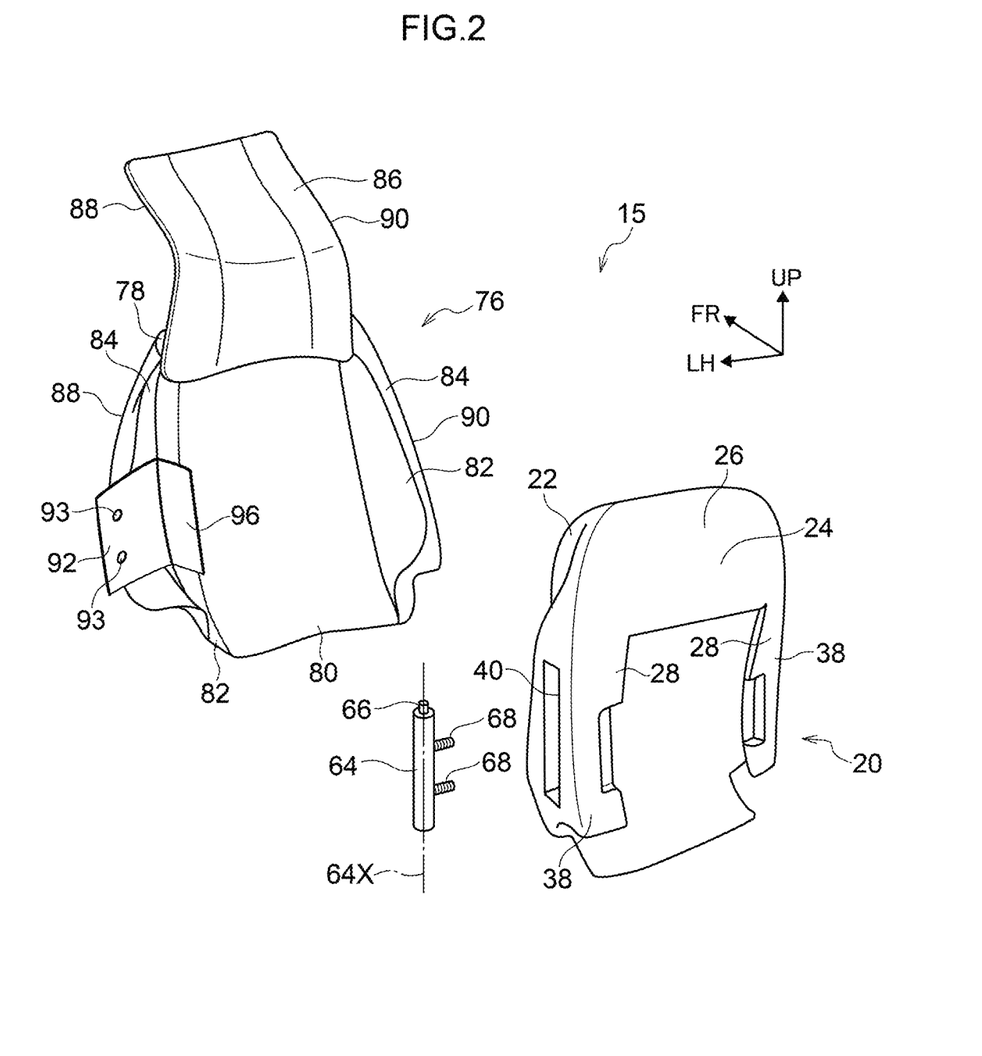
FIG. 2 is an exploded perspective diagram, viewed from the rear, of a cover material, a cushion member and an inflator.
Figure 4:
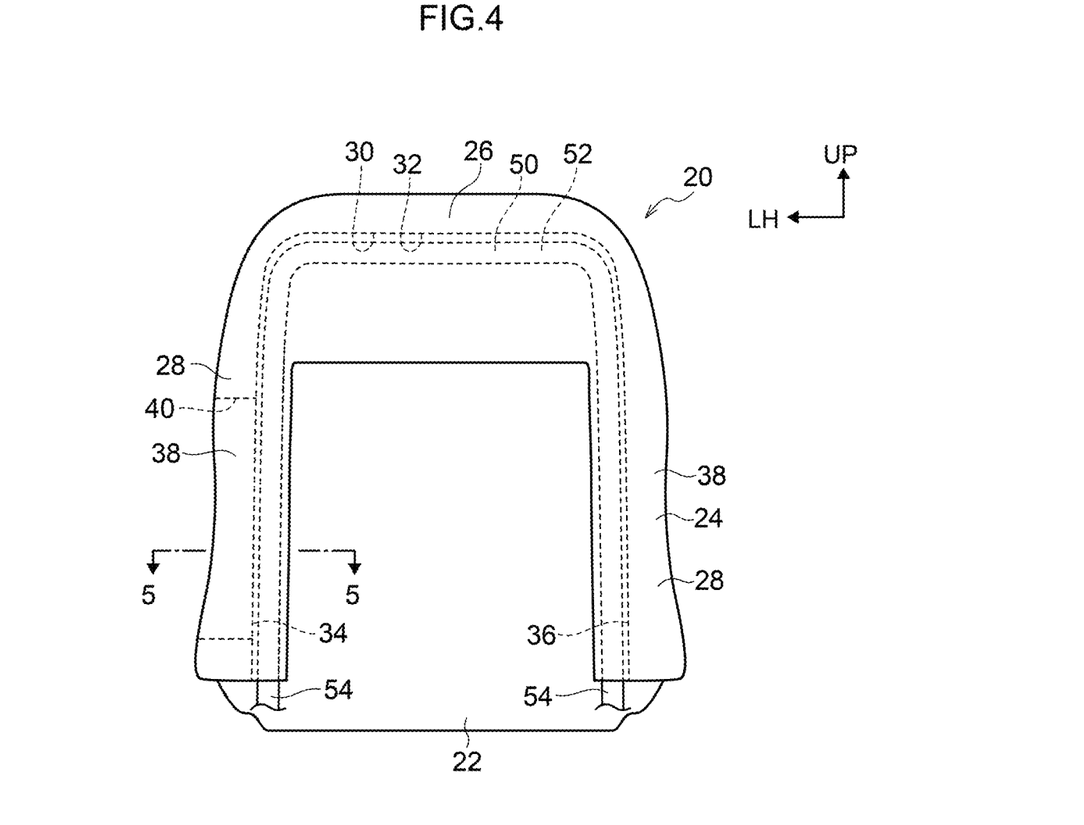
FIG. 4 is a rear view of the cushion member and a seat back frame.
Figure 5:
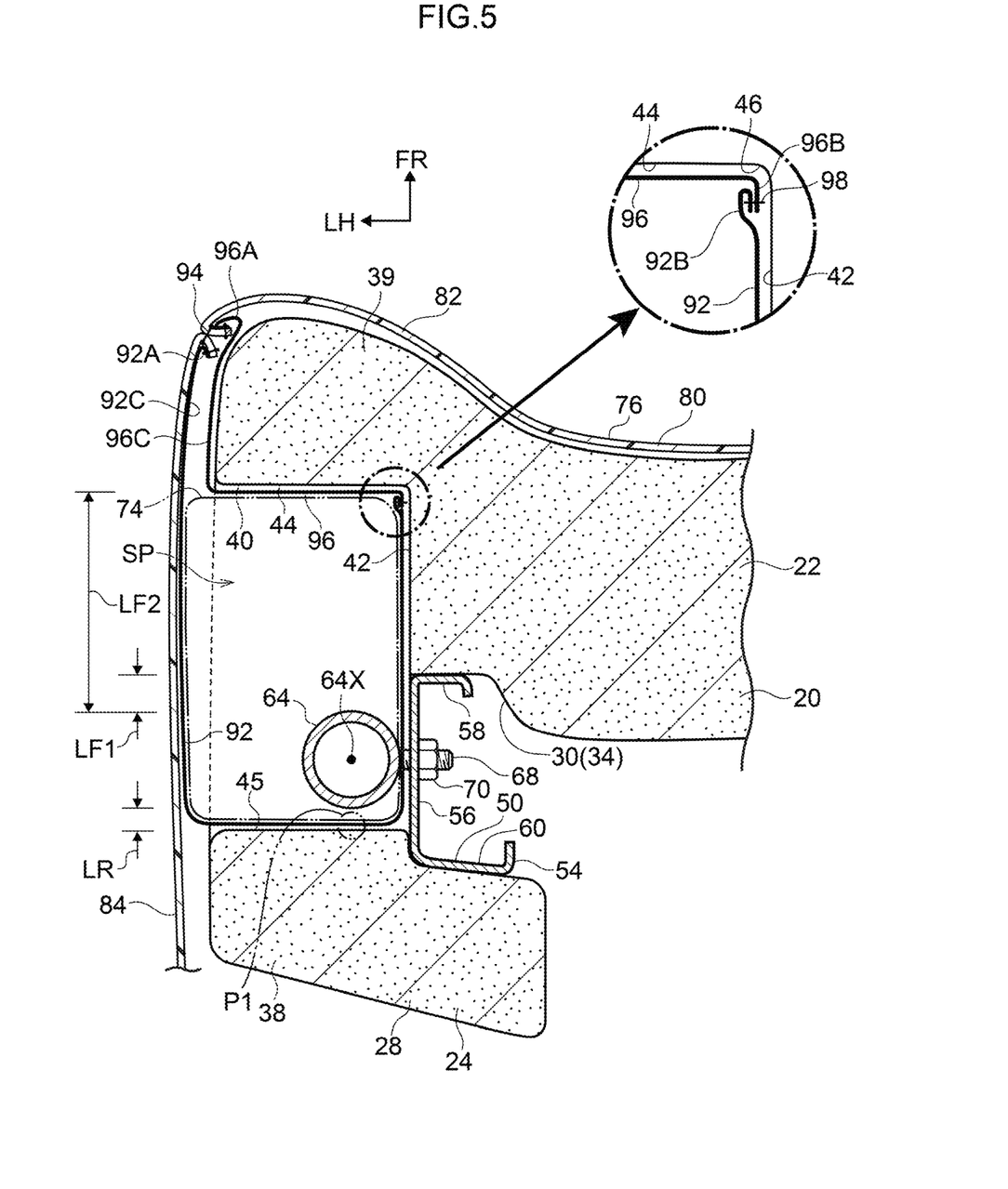
FIG. 5 is a sectional diagram cut along line 5-5 in FIG. 4.

The cushion member 20, which is illustrated in FIG. 2, FIG. 4 and FIG. 5, is constituted of, for example, polyurethane foam. The cushion member 20 includes a main body portion 22 and a rear face portion 24. The rear face portion 24 structures a rear portion of the cushion member 20, and the main body portion 22 structures parts of the cushion member 20 other than the rear face portion 24. The rear face portion 24 includes an upper structural portion 26 and a left and right pair of side structural portions 28, which extend downward from each of left and right end portions of the upper structural portion 26. As shown in FIG. 4 and FIG. 5, a frame accommodation cavity 30 with a substantial inverted U-shape in rear view is formed between a rear face of the main body portion 22 and the rear face portion 24. The frame accommodation cavity 30 is provided with an upper portion cavity 32, a left side portion cavity 34 and a right side portion cavity 36. The upper portion cavity 32 is formed between the upper structural portion 26 and the rear face of the main body portion 22. The left side portion cavity 34 is formed between a right half portion of the side structural portion 28 at the left side and the rear face of the main body portion 22. The right side portion cavity 36 is formed between a left half portion of the side structural portion 28 at the right side and the rear face of the main body portion 22. Lower end portions of the left side portion cavity 34 and the right side portion cavity 36 open out at lower end faces of the left and right side structural portions 28.

The cushion member 20 includes a left and right pair of side portions 38. The side portion 38 at the left side is structured by a left side portion of the main body portion 22, a left end portion of the upper structural portion 26, and the side structural portion 28 at the left side. The side portion 38 at the right side is structured by a right side portion of the main body portion 22, a right end portion of the upper structural portion 26, and the side structural portion 28 at the right side. Front portions of the left and right side portions 38 are structured by bulge portions 39 that protrude further to the front than a central portion of a front face of the cushion member 20 (see FIG. 5). A hollow recess portion (accommodation portion) 40 that extends in the vertical direction is formed in a side face (surface) of the side portion 38 at the left side. A side face shape of the recess portion 40 is substantially rectangular. As shown in FIG. 5, a cross-sectional shape of the recess portion 40 when cut in a plan view is also substantially rectangular. A region in which an inner side end face 42, which is an end face at a vehicle width direction inner side of the recess portion 40, intersects with a front end face 44 of the recess portion 40 is a corner portion 46. A right side face of the corner portion 46 is structured by a front end portion of the inner side end face 42. A rear portion of the recess portion 40 is in fluid communication with a portion of the left side portion cavity 34.

As shown in FIG. 4, the seat back frame 50, which is a framework member of the seat back 15 and is fabricated of metal, is equipped with an upper frame 52 and a left and right pair of side frames 54. The upper frame 52 extends in the left-and-right direction, and the side frames 54 extend downward from each of left and right end portions of the upper frame 52. The upper frame 52 is inserted into the upper portion cavity 32, the side frame 54 at the left side is inserted into the left side portion cavity 34, and the side frame 54 at the right side is inserted into the right side portion cavity 36. In this state, the cushion member 20 is fixed to the seat back frame 50. Lower end portions of the left and right side frames 54 protrude downward beyond lower ends of the left and right side structural portions 28.

As shown in FIG. 5, the side frame 54 at the left side includes a base portion 56, a front end portion 58 and a rear end portion 60. The base portion 56 is in contact with an end face at the left side of the left side portion cavity 34, the front end portion 58 is in contact with a front end face of the left side portion cavity 34, and the rear end portion 60 is in contact with a rear end face of the left side portion cavity 34. Although not shown in the drawings, an upper and lower pair of penetrating holes are formed in the base portion 56. The side frame 54 at the right side has mirror symmetry with the side frame 54 at the left side, except that the penetrating holes are not formed. That is, the side frame 54 at the right side includes others of the base portion 56, which is in contact with an end face at the right side of the right side portion cavity 36, the front end portion 58, which is in contact with a front end face of the right side portion cavity 36, and the rear end portion 60, which is in contact with a rear end face of the right side portion cavity 36.

As shown in FIG. 2, the inflator 64 is a cylindrical member extending along an axis 64X. That is, the inflator 64 is a cylinder-type inflator. An overall length (vertical length) of the inflator 64 is shorter than an overall length (vertical length) of the recess portion 40. A jetting-out portion 66 is provided at an upper end portion of the inflator 64. One end portions of stud bolts 68, which are fabricated of metal, are fixed to two corresponding upper and lower locations of an outer periphery face (surface) of the inflator 64. A connection portion (not shown in the drawings) formed at the airbag 74, which is shown in FIG. 5, is connected to the jetting-out portion 66 in a gas-tight state.

As shown in FIG. 1 and FIG. 2, the cover material 76 that covers surfaces of the cushion member 20 includes an upper portion component part 78, a front face central component part 80, a left and right pair of front face side component parts 82, a left and right pair of side face component parts 84, and a rear face component part 86. The cover material 76 is constituted of a material with flexibility. For example, the cover material 76 is constituted of real leather or synthetic leather. A front edge portion of the upper portion component part 78 and an upper edge portion of the front face central component part 80 are sewn together by a sewing thread (not shown in the drawings), each of left and right side edge portions of the upper portion component part 78 and upper edge portions of the left and right side face component parts 84 are sewn together by sewing threads (not shown in the drawings), and a rear edge portion of the upper portion component part 78 and an upper edge portion of the rear face component part 86 are sewn together by a sewing thread (not shown in the drawings). The front face side component part 82 at the right side is sewn to a right side edge portion of the front face central component part 80 and a front edge portion of the side face component part 84 at the right side by sewing threads (not shown in the drawings). The front face side component part 82 at the left side is sewn to a left side edge portion of the front face central component part 80 and a front edge portion of the side face component part 84 at the left side by sewing threads (not shown in the drawings). A first fastener 88 is provided at a rear edge portion of the side face component part 84 at the left side and a left side edge portion of the rear face component part 86, and a second fastener 90 is provided at a rear edge portion of the side face component part 84 at the right side and a right side edge portion of the rear face component part 86.

Figure 3:
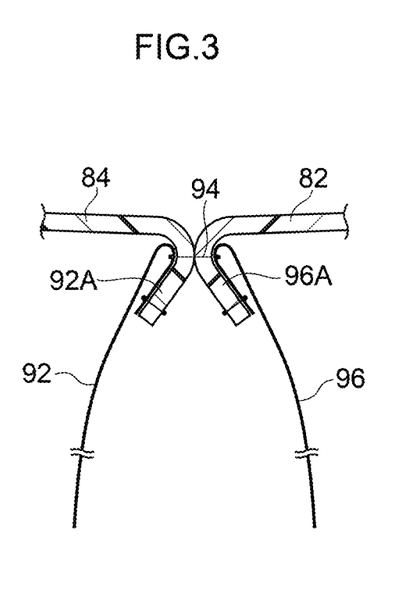
FIG. 3 is a sectional diagram of a joining portion of a front face central component part and front face side component part of the cover material, a first retaining cloth and a second retaining cloth.

As shown in FIG. 2, FIG. 3 and FIG. 5, a left side edge portion of the front face side component part 82 at the left side and a front edge portion of the side face component part 84 at the left side are in contact with one another. One end portions (front end portions) 92A and 96A of the first retaining cloth 92 and the second retaining cloth 96, which are reinforcing fabrics, are joined (connected) using a first sewing thread 94, which is described below, to the left side edge portion of the front face side component part 82 at the left side and the front edge portion of the side face component part 84 at the left side. Unfolded shapes of the first retaining cloth 92 and the second retaining cloth 96 are both substantially rectangular. Vertical dimensions of the first retaining cloth 92 and the second retaining cloth 96 are substantially the same, and are smaller than vertical dimensions of the front face side component part 82 and side face component part 84. The first retaining cloth 92 and second retaining cloth 96 are constituted of a material that is more resistant to stretching than the front face side component part 82 and side face component part 84. For example, the first retaining cloth 92 and the second retaining cloth 96 are constituted of resin sheets or polyester non-woven fabrics.

As shown in FIG. 3, the left side edge portion of the front face side component part 82 at the left side and the front edge portion of the side face component part 84 at the left side are folded over backwards, and this left side edge portion and front edge portion are in contact with one another. The one end portions 92A and 96A of the first retaining cloth 92 and second retaining cloth 96 are sewn by the first sewing thread 94, along the whole lengths thereof, to vertical direction middle portions of the left side edge portion of the front face side component part 82 at the left side and the front edge portion of the side face component part 84 at the left side. Portions of the left side edge portion of the front face side component part 82 at the left side and the front edge portion of the side face component part 84 at the left side other than these middle portions are also sewn to one another by the first sewing thread 94.

As shown in FIG. 2, an upper and lower pair of penetrating holes 93 are formed in the first retaining cloth 92. As shown in FIG. 5, other end portions (rear end portions) 92B and 96B of the first retaining cloth 92 and second retaining cloth 96 are sewn to one another, along the whole lengths thereof, by a second sewing thread (a joining member) 98. Thus, the first retaining cloth 92 and the second retaining cloth 96 structure a tubular body of which both upper and lower ends are open. An accommodation space SP is formed inside this tubular body (see FIG. 5). Materials of the first sewing thread 94 and the second sewing thread 98 are the same, but the second sewing thread 98 is thicker than the first sewing thread 94. Therefore, the second sewing thread 98 has higher mechanical strength and higher heat resistance than the first sewing thread 94.

The cover material 76 (with the first retaining cloth 92 and second retaining cloth 96), the inflator 64 and the airbag 74 are installed at the cushion member 20 by a procedure described below.

First, as shown in FIG. 2, the cover material 76 is distant from the cushion member 20, and the first fastener 88 and second fastener 90 of the cover material 76 are in open states. Next, the cover material 76 is disposed just in front of the cushion member 20, the front face central component part 80 and front face side component parts 82 of the cushion member 20 are laid over the front face of the cover, and the upper portion component part 78 is laid over an upper face of the cushion member 20. An integrated body of the inflator 64 and the airbag 74 is inserted into the accommodation space SP, which is the space inside the first retaining cloth 92 and second retaining cloth 96, such that the pair of stud bolts 68 fixed to the inflator 64 penetrate through the penetrating holes 93 of the first retaining cloth 92.

Then, the side face component part 84 at the left side is brought close to the side portion 38 at the left side of the cushion member 20 from the left side thereof, and an integrated body including the inflator 64, airbag 74, first retaining cloth 92 and second retaining cloth 96 is inserted into the recess portion 40. The pair of stud bolts 68 fixed to the inflator 64 are inserted into the pair of penetrating holes in the side frame 54 and, as shown in FIG. 5, a portion of the first retaining cloth 92 is sandwiched between the outer periphery face of the inflator 64 and the left side face of the base portion 56. Nuts 70, which are threaded onto the respective stud bolts 68, press against the right side face of the base portion 56. Thus, the inflator 64 is fixed to the base portion 56, and the base portion 56 and inflator 64 are substantially parallel in a side view. As is also shown in FIG. 5, substantially the whole of the recess portion 40 is filled up by the inflator 64 and airbag 74. As a result, portions of the first retaining cloth 92 are in contact with the inner side end face 42 and a rear end face 45 of the recess portion 40 and with the left side face of the base portion 56. In addition, a portion of the second retaining cloth 96 is in contact with the front end face 44 of the recess portion 40. The other end portion 92B of the first retaining cloth 92, the other end portion 96B of the second retaining cloth 96, and the second sewing thread 98 are disposed at the corner portion 46. A flow path formation section 96C, which is a region of the second retaining cloth 96 disposed forward of the recess portion 40, is in contact with a front face of the side structural portion 28 at the left side. A flow path formation portion 92C, which is a front portion of the first retaining cloth 92, opposes the flow path formation section 96C.

When the interior of the seat back 15 is viewed along the axis 64X as shown in FIG. 5, at any position in the direction of the axis 64X, the front end portion 58 of the side frame 54 is disposed forward of the front end of the inflator 64. Further, when the interior of the seat back 15 is viewed along the axis 64X, at any position in the direction of the axis 64X, a distance LF1 from the front end of the inflator 64 to the front face of the front end portion 58 is longer than a distance LR from the rear end of the inflator 64 to the rear end face 45 of the recess portion 40, and at any position in the direction of the axis 64X, a distance LF2 from the front end of the inflator 64 to the front end face 44 of the recess portion 40 is longer than the distance LF1.

Finally, the left and right side face component parts 84 are laid over the respective side faces of the left and right side portions 38 of the cushion member 20 (see the side face component part 84 at the left side in FIG. 5), and the rear face component part 86 is laid over the rear face of the cushion member 20. Then the first fastener 88 and the second fastener 90 are closed. In this way, the seat back 15 shown in FIG. 1 is completed. The head rest 99 is attached to the upper end portion of the completed seat back 15. Lower end portions of the left and right side frames 54 are connected to a reclining mechanism (not shown in the drawings) provided at the rear end portion of the seat cushion 11. In this way, the seat 10 shown in FIG. 1 is completed.

Now, operation and effects of the present exemplary embodiment are described.

When, for example, the vehicle in which the seat 10 is installed collides with another object, the inflator 64 activates and produces high-pressure gas. This high-pressure gas is supplied through the jetting-out portion 66 to the interior of the airbag 74, and the airbag 74 expands while the folded state of the airbag 74 unfolds. As described above, the first retaining cloth 92 and the second retaining cloth 96 are more resistant to stretching than the front face side component part 82 and the side face component part 84. Therefore, an expansion direction of the airbag 74 is restricted to a front direction by the first retaining cloth 92 and the second retaining cloth 96. The airbag 74 expanding toward the front passes between the flow path formation portion 92C and the flow path formation section 96C. Hence, the airbag 74 expanding toward the front applies large pressure forces to the one end portion 92A of the first retaining cloth 92 and the one end portion 96A of the second retaining cloth 96. In consequence, the first sewing thread 94 breaks and the left side edge portion of the front face side component part 82 ruptures from the right side edge portion of the side face component part 84. The airbag 74 passes through a rupture portion (an opening) formed between the front face side component part 82 and the side face component part 84, and expands to the front of the seat back 15.

Now, when the inflator 64 produces the gas, a large quantity of heat generated by the inflator 64 is released into the recess portion 40 (the accommodation space SP). If, for example, the second sewing thread 98 (the other end portions 92B and 96B) were at a position µl depicted by an imaginary line in FIG. 5, a distance from the inflator 64 to the second sewing thread 98 would be small and a large amount of heat would reach the second sewing thread 98. In this structure, the second sewing thread 98 might break due to the effect of the heat before the airbag 74 had passed through the rupture portion (the opening) and expanded to the front of the seat back 15. In this situation, the function of the first retaining cloth 92 and second retaining cloth 96 restricting the expansion direction of the airbag 74 would be weakened and the airbag 74 would be less likely to expand to the front of the seat back 15.

By contrast, in the seat back 15 according to the present exemplary embodiment, when the interior of the seat back 15 is viewed along the axis 64X of the inflator 64, at any position in the direction of the axis 64X, the front end of the front end portion 58 of the side frame 54 is disposed forward of the front end of the inflator 64, and the second sewing thread 98 that is the joining member joining the other end portions 92B and 96B is disposed forward of the front end of the front end portion 58. More specifically, the second sewing thread 98 is disposed at the corner portion 46. In other words, a distance from the front end of the inflator 64 to the second sewing thread 98 is far. Consequently, the heat generated by the inflator 64 is unlikely to affect the second sewing thread 98. As a result, when the inflator 64 of the present exemplary embodiment generates heat, there is little risk of the function of the first retaining cloth 92 and second retaining cloth 96 restricting the expansion direction of the airbag 74 being weakened. Therefore, the airbag 74 is likely to expand consistently to the front of the seat back 15.

Further, if the other end portions 92B and 96B were disposed at a left end portion of the recess portion 40 of the cushion member 20, the other end portions 92B and 96B might press against the inner face of the side face component part 84 via the first retaining cloth 92, and a portion of the side face component part 84 pressed by the other end portions 92B and 96B might be raised to the outer side. By contrast, in the present exemplary embodiment, the other end portions 92B and 96B are disposed at the corner portion 46 that is distant to the right side from the left end portion of the recess portion 40. That is, the other end portions 92B and 96B oppose the front end portion of the inner side end face 42 of the recess portion 40. Therefore, there is no risk of a portion of the side face component part 84 being raised to the outer side because of the other end portions 92B and 96B.

The second sewing thread 98 has higher mechanical strength and heat resistance than the first sewing thread 94. Therefore, the second sewing thread 98 is less likely to be damaged by the heat generated by the inflator 64 than if the second sewing thread 98 had equal or lower mechanical strength and heat resistance than the first sewing thread 94.

An exemplary embodiment of the present disclosure is described above, but the present disclosure is not limited to this exemplary embodiment.

For example, when the interior of the seat back 15 is viewed along the axis 64X of the inflator 64, at any position in the direction of the axis 64X, the positions of the other end portions 92B and 96B and second sewing thread 98 may be disposed to the rear relative to the corner portion 46, provided the same are disposed forward of the front end portion 58.

Furthermore, the other end portions 92B and 96B and second sewing thread 98 may be at a different position from the right side edge portion of the recess portion 40. For example, the position of the other end portions 92B and 96B and second sewing thread 98 may be a position that is at the left side relative to the inner side end face 42 and that opposes the front end face 44 of the recess portion 40.

The other end portions 92B and 96B may be joined by a joining member other than the second sewing thread 98. For example, the joining member may be an adhesive that adheres the other end portion 92B and other end portion 96B, and the other end portion 92B and other end portion 96B may be thermally welded.

The recess portion 40 may be formed in a side face (surface) of the side portion 38 at the right side, and the inflator 64 and airbag 74 may be accommodated in this recess portion 40. When the inflator 64 produces gas in this structure, the expanding airbag 74 expands to the front of the seat back 15 while rupturing a joining portion between the front face side component part 82 and side face component part 84 at the right side.

A hollow accommodation portion whose left end portion is closed up may be formed inside the side portion 38 at the left side instead of the recess portion 40, and the inflator 64 and airbag 74 may be accommodated in this accommodation portion. Further, a hollow accommodation portion whose right end portion is closed up may be formed inside the side portion 38 at the right side instead of the recess portion 40, and the inflator 64 and airbag 74 may be accommodated in this accommodation portion.

What is claimed is:

1. A seat back of a vehicle seat, the seat back comprising:
    a cushion member including a side portion in which a hollow accommodation portion is formed;
    a side frame that forms a side portion of a seat back frame that is provided inside the cushion member;
    a cover material that covers a surface of the cushion member;
    an airbag accommodated in a folded state in the accommodation portion;
    a cylindrical inflator fixed to the side frame in the accommodation portion, the inflator being configured to supply gas to the airbag such that the airbag expands to the outer side of the cover material while rupturing a rupture portion formed in a portion of the cover material;
    a first retaining cloth, one end portion of which is connected to the rupture portion;
    a second retaining cloth, one end portion of which is connected to the rupture portion and another end portion of which is connected to another end portion of the first retaining cloth, the second retaining cloth forming an accommodation space that accommodates the airbag and the inflator between the second retaining cloth and the first retaining cloth; and
    a joining member that joins together the respective other end portions of the first retaining cloth and second retaining cloth at the accommodation portion,
    wherein, when viewed along an axis of the inflator, a front end portion of the side frame is disposed forward of the inflator and the joining member is disposed forward of a front end portion of the side frame.

2. The seat back of a vehicle seat according to claim 1, wherein an inner side end face of the accommodation portion opposes the respective other end portions of the first retaining cloth and second retaining cloth, the inner side end face being an end face of the accommodation portion at a width direction inner side of the seat back.

3. The seat back of a vehicle seat according to claim 2 wherein:
    when viewed along the axis of the inflator, a front end face of the accommodation portion is disposed forward of the front end portion of the side frame, and
    a region of the accommodation portion at which the front end face and the inner side end face are connected opposes the respective other end portions of the first retaining cloth and second retaining cloth.

4. The seat back of a vehicle seat according to claim 1, wherein:
    the respective one end portions of the first retaining cloth and second retaining cloth are sewn to the rupture portion by a first sewing thread, and
    the respective other end portions of the first retaining cloth and second retaining cloth are sewn to one another by a second sewing thread with a higher strength than the first sewing thread.

5. The seat back of a vehicle seat according to claim 2, wherein:
    the respective one end portions of the first retaining cloth and second retaining cloth are sewn to the rupture portion by a first sewing thread, and
    the respective other end portions of the first retaining cloth and second retaining cloth are sewn to one another by a second sewing thread with a higher strength than the first sewing thread.

\* \* \* \* \*